United States Patent [19]

Bussard

[11] Patent Number: 4,859,399
[45] Date of Patent: Aug. 22, 1989

[54] MODULAR FUSION POWER APPARATUS USING DISPOSABLE CORE

[75] Inventor: Robert W. Bussard, Arlington, Va.

[73] Assignee: FDX Patents Holding Company, N.V., Curacao, Netherlands

[21] Appl. No.: 113,362

[22] Filed: Oct. 27, 1987

Related U.S. Application Data

[60] Continuation of Ser. No. 738,906, May 29, 1985, abandoned, which is a continuation of Ser. No. 408,635, Aug. 16, 1982, abandoned, which is a division of Ser. No. 87,439, Oct. 22, 1979, Pat. No. 4,367,193, which is a continuation of Ser. No. 841,903, Oct. 13, 1977, abandoned.

[51] Int. Cl.$^4$ .............................................. C21B 1/00
[52] U.S. Cl. ....................................... 376/133; 376/143; 376/146
[58] Field of Search ............... 376/146, 133, 131, 100, 376/143

[56] References Cited

U.S. PATENT DOCUMENTS

| | | | |
|---|---|---|---|
| 2,991,238 | 7/1961 | Phillips et al. | 376/146 |
| 3,113,082 | 12/1963 | Imhoff et al. | 376/146 |
| 3,152,958 | 10/1964 | Allen | 376/146 |
| 3,436,918 | 4/1969 | Brogan et al. | 376/911 |
| 3,778,343 | 12/1973 | Coppi et al. | 376/133 |
| 3,886,402 | 5/1975 | Furth et al. | 376/131 |
| 4,363,775 | 12/1982 | Bussard et al. | 376/146 |

FOREIGN PATENT DOCUMENTS

| | | | |
|---|---|---|---|
| 489763 | 4/1975 | Australia | 376/911 |
| 0064594 | 5/1977 | Japan | 376/146 |
| 1414823 | 11/1975 | United Kingdom | 376/911 |

OTHER PUBLICATIONS

Matt-841, 5/71, Dawson et al., pp. 1–11.
LWS-24920 (Rev.), 10/53, Powell, pp. 1–13.
Nuclear Technology, vol. 30, 9/76, pp. 261–272, 281, 282, 292–298, Stacey et al.
Scientific American, vol. 224, No. 6, 6/71, pp. 21, 28–33.
MATT-1050, 8/74, pp. 526–529.
Nuclear Technology, vol. 20, 12/73, pp. 161–170, Leonard, Jr.
Technology Review, 12/76, Rose, pp. 20–24, 27, 28, 32–39, 41–43.
"Controlled Nuclear Fusion: Current Research & Potential Process", 1978, pp. 5–7, 9–11, 33–36.
UWFDM-129, vol. II, part 2, 10/75, pp. 1–4, 23–35, 52.
CONF-740 402-P1, vol. 1, 4/74, pp. 21–31, 63, 211–221, 238–252, 533–538, 541–543, 546, 665–667.

*Primary Examiner*—Harvey E. Behrend
*Attorney, Agent, or Firm*—Foley & Lardner, Schwartz, Jeffery, Schwaab, Mack, Blumenthal & Evans

[57] ABSTRACT

A fusion power generating device is disclosed having a relatively small and inexpensive core region which may be contained within an energy absorbing blanket region. The fusion power core region contains apparatus of the toroidal type for confining a high density plasma. The fusion power core is removable from the blanket region and may be disposed and/or recycled for subsequent use within the same blanket region. The high density plasma produces a large radiation and particle flux on the first wall of the plasma core region thereby necessitating replacement of the core from the blanket region from time to time. A series of disposable and replaceable central core regions are disclosed for a large-scale economical electrical power generating plant.

20 Claims, 5 Drawing Sheets

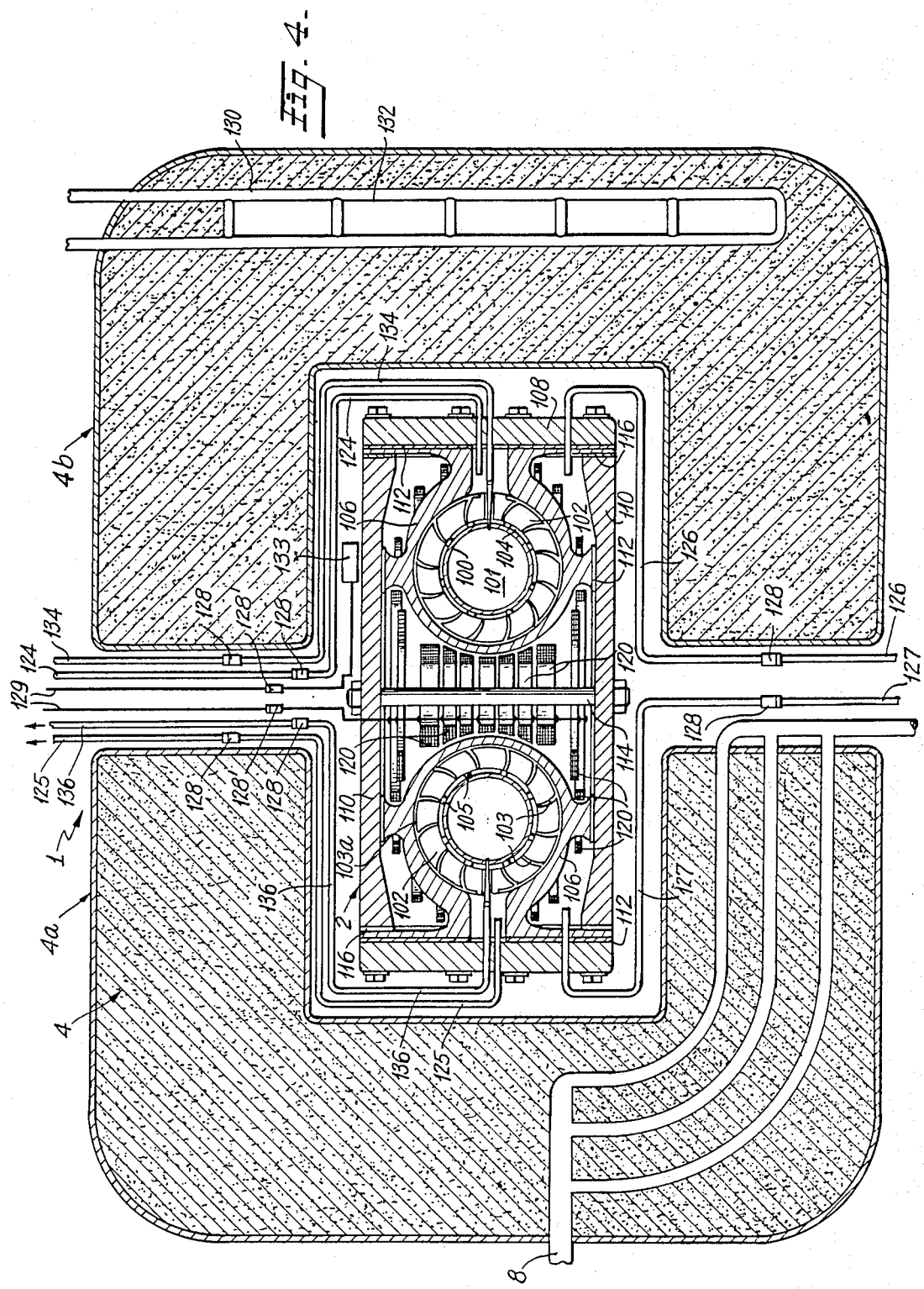

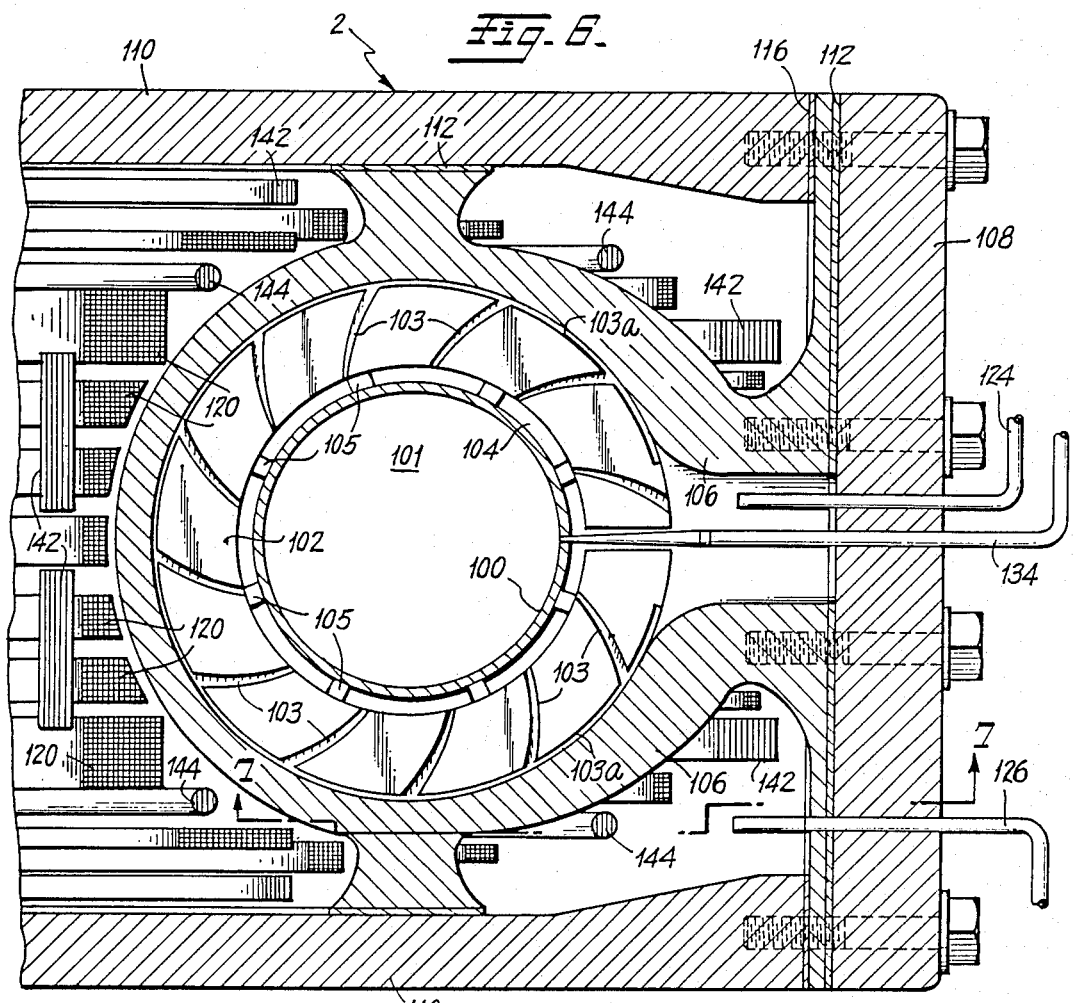
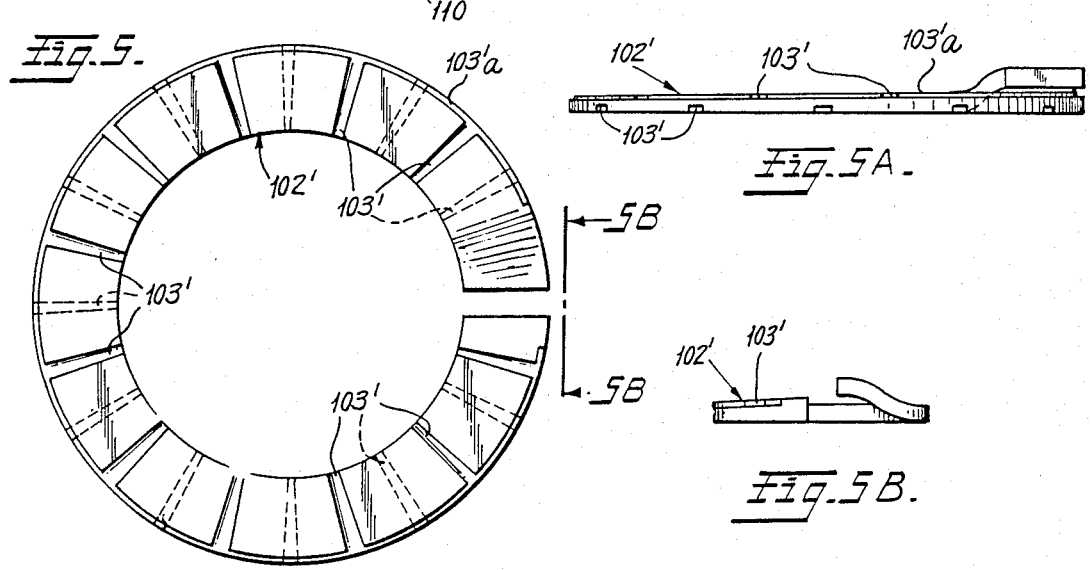

MODULAR FUSION POWER APPARATUS USING DISPOSABLE CORE

This application is a continuation of application Ser. No. 738,906, filed May 29, 1985, now abandoned; which is a continuation of application Ser. No. 408,635, filed Aug. 16, 1982 now abandoned; which is a division of application Ser. No. 087,439, filed Oct. 22, 1979 now U.S. Pat. No. 4,367,193; which is a continuation of application Ser. No. 841,903 filed Oct. 13, 1977, now abandoned.

BACKGROUND OF THE INVENTION

1. Field of the Invention

The invention is in the field of fusion power generators, particularly those utilizing fusion reactors of the magnetic confinement type.

2. Description of the Prior Art

Prior art concepts with regard to utilization of fusion energy for the economic production of power have been premised upon an ultimate design of a large scale reactor able to produce the desired power and lasting a sufficiently long time to justify the large capital investment required to build the reactor. The economics of a large capital investment with a long reactor lifetime have been carried out from the fission reactor field as an inherent basis in the design of economic fusion power plants. Consequently, plasma temperatures and densities have been parameterized to yield a maximum wall loading of the first wall (vacuum wall surrounding the plasma) consistent with durability of wall materials and a long replacement time which is economically acceptable. Typically, a maximum wall loading of 1–3 MW/m$^2$ has been thought reasonable with a minimum replacement time of approximately five years.

Consistent with the projected long life of the fusion reactor, the plasma core has traditionally been made large so as to allow large power output with low energy loadings on the first wall as well as for reasons of plasma confinement in the regimes of traditional interest. Furthermore, the plasma core has traditionally been surrounded directly with a thick material blanket region to absorb the plasma-generated neutron energy as well as to protect the large and expensive magnetic field windings surrounding the blanket. These large field windings, required to confine plasma in the plasma core, must be large enough to surround the plasma core. Traditionally, superconducting magnets have been utilized in order to reduce the power required to drive the magnetic coils, and the blanket thus served to remove the coils from the regime of high neutron fluxes and associated radiation damage to which the superconductors are susceptible. Such superconducting magnets have a limited magnetic field capability of between approximately 80 and 150 kilogauss. The maximum permissible density and temperature of the plasma is in turn dictated by the strength of the magnetic field possible which, because of the foregoing considerations has been limited to the maximum strength available from the superconducting magnets. Thus, traditional fusion device concepts have involved large plasma volumes, thick blankets of large volume, low first wall loadings, and the use of large, expensive superconducting magnets placed outside the regions of the blanket, plasma core, and any added auxiliary shielding.

In utilizing large volume experimental reactors of the tokamak-type, and in the conceptual design of practical large volume toroidal reactors, ohmic heating inherently plays a negligible role in the process of raising the plasma temperatures to values of thermonuclear interests. This is true because the current density which can be induced by any toroidal plasma configuration is proportional to the magnetic field divided by the major radius of the torus. For the fields attainable by superconducting magnets and the dimensions of traditionally envisioned toroidal devices, the current density is insufficient to yield significant ohmic heating of the plasma. Thus, in both the experimental and conceptual designs large sources of energetic beams of neutral particles have been utilized to provide power to the plasma on the order of tens to hundreds of megawatts. Neutral beam injection techniques require the utilization of large access ports to the plasma through the surrounding magnetic structure thus adding to the cost and complexity of any practical fusion power plant. Additionally, in order to ensure proper beam penetration to the center of the plasma column, operation of neutral beam injection devices has been limited to plasma densities the order of $10^{14}$/cm$^3$.

As experimental fusion devices, blankets have typically not been employed inasmuch as they are unnecessary to study many of the basic physical processes involved in the plasma such as plasma fusion ignition, confinement, plasma heating and fusion reaction studies. The tokamak has provided an experimental tool for testing the feasibility of plasma confinement and has been the subject of extensive experimentaion, e.g., see "The Tokamak Approach in Fusion Research" by Bruno Coppi et al, *Scientific American*, July 1972, U.S. Pat. No. 3,778,343 and "Tokamak Experimental Power Reactor Conceptual Design", Vols. 1 and 2, ANL/CTR-76-3 (August 1976), all of which documents are incorporated herein by reference. One particular tokamak device, the Alcator, has been designed to achieve large plasma currents with high toroidal magnetic field strengths. Typically, plasma currents on the order of 100 kiloamps with field strengths up to 82 kilogauss have been obtained. In such experimental devices, plasmas with densities up to $9 \times 10^{14}$ particles per cubic centimeter with temperatures up to 1 keV have been contained. However, the Alcator approach is not typical of the majority of prior art devices which have focused on toroidal devices of much lesser density, large dimension, smaller magnetic fields and which require extensive auxiliary heating (generally by neutral beam injection) to strive for plasma ignition temperatures.

The approach of a very high yield, high density and a small compact device such as the Alcator has been considered in the prior art as limited to merely academic interest for purposes of physics studies of plasma behavior but has not been considered of interest for future applications to practical fusion power production.

Another experimental area that has been developed for the magnetic confinement of thermonuclear plasma is embodied in the stellarator concept. While in the tokamak, the confining magnetic field is partially produced by external coils and partially by the current induced in the plasma, in a stellarator, the confining field is produced only by external coils. Both the tokamak and the stellarator, however, may be considered forms of a toroidal plasma confinement device.

SUMMARY OF THE INVENTION

It is an object of the invention to overcome the disavantages of the prior art by providing a controlled nuclear fusion device for power generation.

Another object of the invention is to provide a modular fusion reactor system wherein a plurality of fusion power cores, each of relatively small size and low cost, are energized to provide a power system. Energy from the fusion power cores is absorbed in the core structure and within a surrounding blanket, and the cores themselves may be individually removed from the blanket and replaced by new cores as the cores deteriorate from high radiation flux damage.

It is another object of this invention to provide a power generating system utilizing a plurality of fusion power cores, each of the toroidal-type and driven to ignition by ohmic heating techniques.

In accordance with the principles of the invention, a fusion power device is provided and comprises a plasma containment means for containing a fusible plasma within a region and a blanket means which surrounds a substantial portion of the containment means. The plasma containiment means is separable from the blanket means and may be replaced upon excessive radiation damage by a new or refabricated containment means. Means are also provided for feeding the fusible fuel into the containment means for forming the plasma. A power producing regime of temperature and density may be achieved using ohmic heating as effected, for example, by e-beam bombardment. Thermal energy extraction means are provided for extracting energy from the plasma containment means and/or the blanket means, and means are provided for converting the extracted thermal energy into mechanical and/or electrical energy.

The disposable and/or recyclable characteristic of the considered fusion power core makes the remote handling and maintenance system for it considerably simpler and less expensive than those envisioned for a conventional large tokamak reactor where the removal and replacement of heavy and interconnected components is involved.

The ability to place an easily accessible blanket at the outside of the fusion power core without encumberance of a surrounding magnetic coil system makes it possible to adopt the simplest and least expensive system to breed Tritium.

The absence of a need for easy access to the inside components of the fusion power core makes it possible to adopt a tight aspect ratio toroidal configuration. This feature, which can also be coupled with the effects of adopted auxiliary heating systems that tend to produce well distributed plasma current densities, by enhancing the temperature at the outer edge of the plasma column, makes it possible to operate the plasma device with a relatively low safety margin against macroscopic instabilities. This is equivalent to a high degree of utilization of confining magnetic field.

The small size and relatively low weight of the fusion core make it suitable to develop it, unlike the envisioned large size tokamaks, into one of the elements of a power plant to power or propel a ship, a space craft, or any other suitable type of vehicle.

A choice of the appropriate structural materials of the fusion power core can be made with the objective to decrease their radio-activation to a minimum. For example, aluminum based metals can be considered for this purpose.

BRIEF DESCRIPTION OF THE DRAWINGS

Other objects and advantages of the invention will become apparent in reference to the detailed description set forth herein, taken in conjunction with the drawings wherein:

FIG. 4 is a top cross-sectional view of a module in accordance with the invention;

FIG. 5 is a top view of a disk coil utilized in the fusion power core of the invention;

FIG. 5A is a side view of the disk coil of FIG. 5;

FIG. 5B is a partial side view of the disk coil taken along line 5B—5B of FIG. 5;

FIG. 6 is an enlarged cross-sectional view of the fusion power core similar to that shown in FIG. 4;

DETAILED DESCRIPTION OF THE PREFERRED EMBODIMENT

Figure 1:
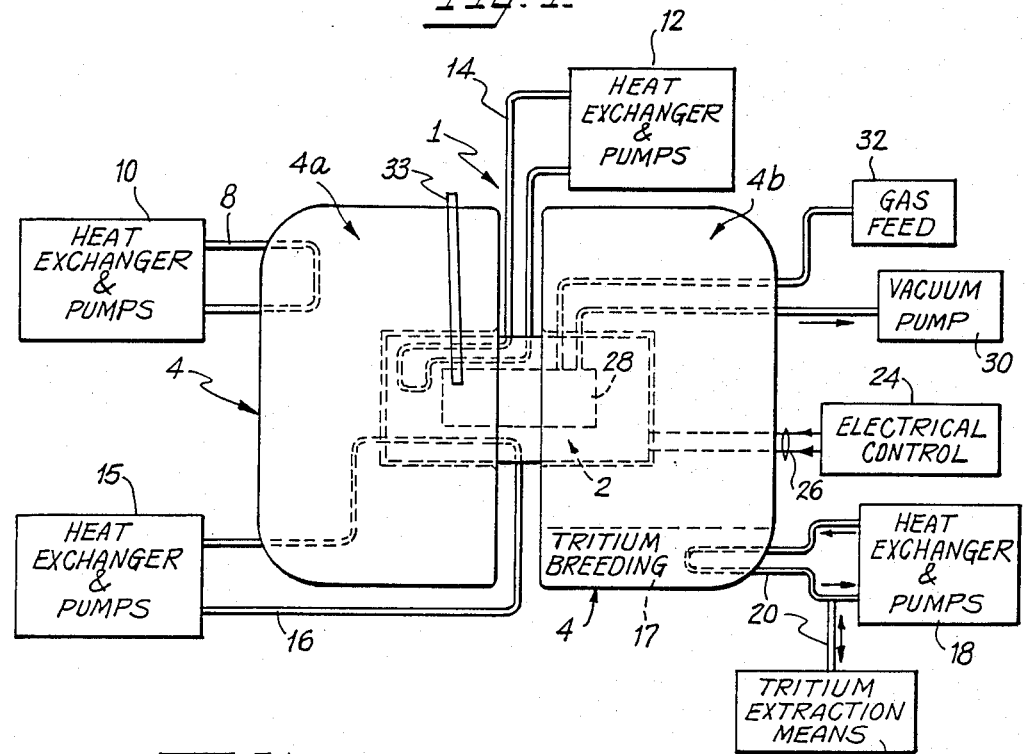
FIG. 1 is a schematic block diagram of a single module showing the major components thereof together with the various fuel/thermal/electrical interconnections.

FIG. 1 illustrates an embodiment of a module 1 of a fusion generating device in accordance with the principles of the invention. A fusion power core 2 is shown housed within two clam-shaped regions 4a and 4b of a blanket 4. The blanket 4 absorbs radiation emanating from the fusion power core as a result of the fusion reaction. It is the function of the blanket 4 to absorb such radiated energy which appears mostly as neutrons generated in the fusion reaction. These neutrons could be used to generate fission in fission plates incorporated as neutron multipliers in the blanket assembly or simply for the production of heat by neutron slowing and neutron capture reactions. Such heat energy is extracted by means of a coolant passing through conduits 8 which are shown diagrammatically as penetrating the blanket region 4a. The conduit 8 may in fact be a plurality of cavities or conduits passing through both regions 4a and 4b of blanket 4 and may be of the multiple artery type so as to cover a large region of the blanket to absorb maximum amount of heat energy. The fluid conduit 8 passes to heat exchange means and pump means indicated at 10. The blanket material may, for example, be composed of graphite, fluoride salts, beryllium or other materials as well known in the art. The coolant material may be water or oil or any other suitable fluid serving a cooling/heat extracting function. Heat exchange means 10 may be connected to thermal/electrical or thermal/-mechanical power generating equipment.

Also shown in FIG. 1 is a heat exchange means and pump means 12 associated with a conduit 14 which passes through the blanket 4 and into the fusion power core 2. The coolant flowing through conduit 14 serves to cool the field coils utilized to provide the magnetic confinement within the fusion power core 2. Only one such conduit 14 is illustrated although it is understood that a plurality of conduits may be provided (and a single or an associated plurality of heat exchange means and pump means as required) for cooling various sections of the magnetic field coils. The coolant stream may provide heat energy to heat exchange means 12 for utilization in thermal/electrical conversion equipment in order to produce electrical power therefrom and/or thermal/mechanical equipment for generation of mechanical (shaft) energy. The coolant/thermal extraction system provided by conduits 14 and heat exchange means 12 may be separate and independent from the coolant/thermal extraction system employed for the blanket 4 or alternately the two systems may utilize common components. The temperatures within the coils of the fusion core must be kept below the melting or structurally limiting temperatures of the coil materials (copper or aluminum coils, for example). The heat developed within the blanket 4, however, has no such restriction and the coolant within the blanket may thus be heated to considerably higher temperatures than the coolant passing through the fusion power core (conduits 14). The thermal/electrical conversion equipment, for example, associated with the higher temperature coolant wil thus be able to operate at higher thermal-/electrical conversion efficiencies than possible for the lower temperature coolant. For a fusion power core of the toroidal type, coolant is typically provided in the toroidal field coils but may also be provided for other field coils if desired (ohmic heating, vertical field or auxiliary heating coils). Additionally, coolant means similar to that shown by conduits 14 and heat exchange and pump means 12 may be provided for other regions of the fusion power core, such as a region between the toroidal shell and the toroidal coil as more fully set forth below.

An alternate or additional means for cooling and obtaining thermal energy from the fusion power core 2 and blanket 4 is provided by heat exchange means and pump means 15 together with conduits 16. In this embodiment, the fluid inflow to module 1 passes between the blanket regions 4a and 4b and is heated by the fusion power core 2 which effectively serves to preheat the coolant which is subsequently heated to higher temperatures by energy from the blanket region 4. In this manner, a single coolant may be utilized with a single thermal/electrical conversion unit.

Blanket 4 may also contain a tritium breeding section 17 which may contain for example lithium utilized to capture neutrons for the breeding of tritium for subsequent use in the D,T fusion reaction. Heat exchange and pump means 18 together with conduits 20 may be utilized to cool the lithium breeding section 16, or alternately, a molten fluoride salt of lithium (or lithium plus beryllium, for example) may be used to provide for tritium breeding as well as self-cooling. Appropriate tritium extraction apparatus 22 is connected to the conduits 20 to extract the tritium for subsequent utilization.

An electrical control means 24 is utilized to provide the current to drive the various field coils within the fusion power core via a plurality of power conductors 26. Thus, in the case of a toroidal or tokamak-type device, conductors 26 serve to provide the necessary current for the toroidal field as well as for the ohmic heating transformer, auxiliary heating coils, vertical coils and the like.

The fusion power core 2 is provided with a containment region 28 for housing the plasma. In the embodiment in which the toroidal-type fusion power core is utilized, the containment region 28 is simply the toroidal shell or vacuum cavity containing the plasma gas. Means are provided for evacuating the containment region 28 such as by utilizing a vacuum pump 30. Gas feeding means 32 are also shown for supplying the fusible fuel or gas to the containment region 28. The gas feeding means 32 may comprise for example a supply of D,T gas and remotely operable valve means for controlling flow of gas into the containment region 28. Each fusion power core 2 also may be provided with diagnostic ports 33 for measuring plasma position, density and temperature as is well known in the art.

As stated below, the fusion power core 2 may be of the tokamak type and include the required toroidal magnetic field coils and ohmic heating coils. However, it is envisioned that other fusion power cores may be utilized wherein other types of magnetic confinement are obtained, e.g., stellarator confinement principles, for example. The description herein is presented in terms of specific embodiment of the tokamak-type fusion reactor and specifically utilizing a D, T fusion reaction process. However, it is clear that other fusion reaction processes, for example, the D,D or D,$He^3$ may be utilized separately, or simultaneously with D,T.

A prime consideration of the present invention is the fact that the fusion power core 2 is removable from the blanket 4 and, in fact, is disposable, or recyclable. The high temperatures and high fields attained in the fusion power core result in an extremely high radiation flux significantly higher than the first wall loading heretofore assumed acceptable for practical large scale fusion reactor designs. As a result of such a high radiation flux on the first wall of the fusion power core, the fusion power core may deteriorate over a relatively short time. In this circumstance, the present invention allows for and provides a means for replacing the entire fusion power core. Depending upon specific operating parameters replacement could be required at time intervals on the order of weeks to months. However, the relatively small size of the fusion power core 2 will allow economical means of removal and subsequent disposal and/or reprocessing/recycling thereof and replacement by a new fusion power core utilizing the same blanket 4. Consequently, the blanket regions 4a and 4b are made separable, and the fusion power core 2 may be removed, therefrom. For tokamak-type fusion power cores, it is possible to reprocess the fusion power core 2 such that the copper and other materials within the core may be utilized again. As an exemplary conventional frame of reference, assuming a D,T reaction, the fusion power core may have a radius on the order of 1 meter and height of approximately 1 meter. Each blanket region may typically be on the order of 1 meter thick. In practice the exact thickness and shape of the blanket is somewhat arbitrary and may be designed to provide adequate thickness for capture of neutrons generated in the fusion power core. Additionally, the first wall of the blanket shell may be made of high Z or other materials which allow n,2n reactions to enhance blanket neutron yield thus assuring a simple T-breeding design.

Figures 2A, 2B, 2C:
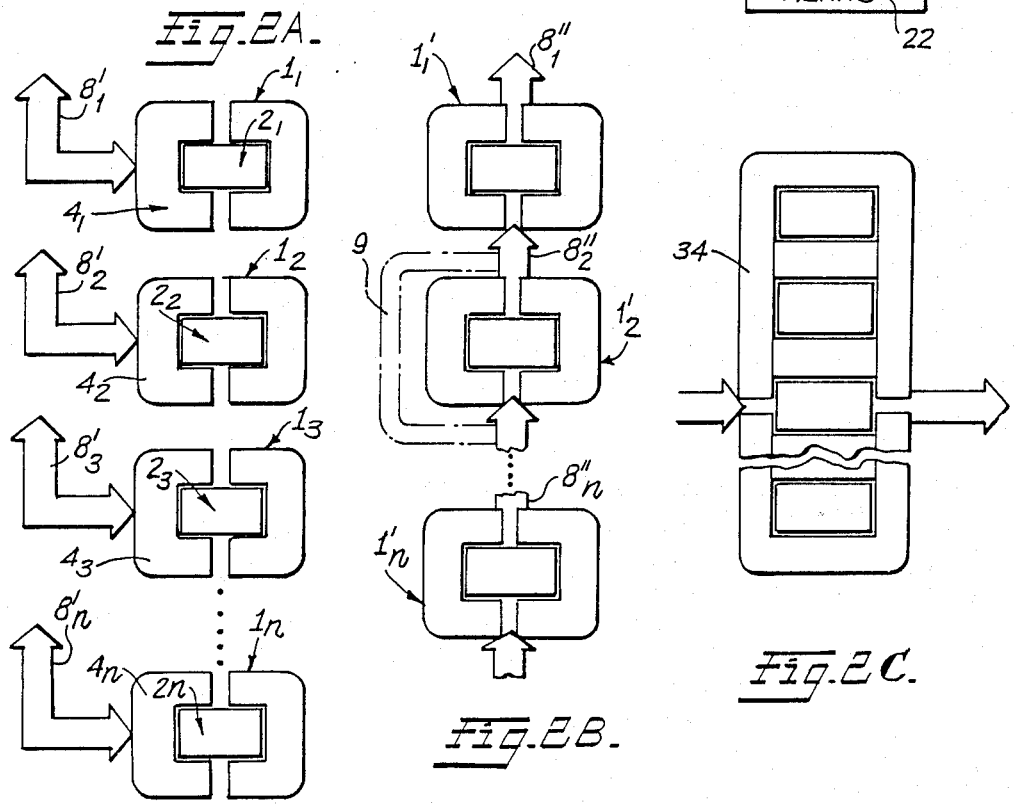
FIGS. 2A, 2B and 2C illustrate a plurality of modules having different thermal transport embodiments.

As shown in FIG. 2A, a plurality of modules $1_1 \ldots 1_n$, each having a corresponding blanket $4_1 \ldots 4_n$ and cores $2_1 \ldots 2_n$ may be arranged together to form a power generating system wherein corresponding coolant conduits $8'_1 \ldots 8'_n$ are separately connected to one or more heat exchange and pump means (not shown). An alternate arrangement is shown in FIG. 2B wherein a plurality of modules $1'_1, 1'_2 \ldots 1'_n$ is shown with series connected coolant conduits $8''_1, 8''_2 \ldots 8''_n$. In any such series arrangement, a system bypass means 9 may be provided so that upon replacement of any individual fusion power core, the remaining assembly of modules 1' may be left operational. In FIGS. 2A and 2B, the arrows labeled $8'_1, 8'_2$ etc. and $8''_1, 8''_2$ etc. are used to represent both the blanket coolant/thermal extraction system and corresponding fusion power core coolant/thermal extraction system whether they be separate or integral systems as taught in FIG. 1. Obviously, on FIG. 2B, the fusion power core (blanket) coolant/thermal extraction system could be connected in series with a separate plurality of blanket (fusion power core) coolant/thermal extraction system for the modules. It is advantageous in these configurations to closely pack the modules 1 together so that neutrons escaping one module may be trapped in an adjacent module thereby increasing overall efficiency.

FIG. 2C shows yet another embodiment of the invention wherein a plurality of fusion power cores are surrounded by a single blanket 34.

Figure 3:
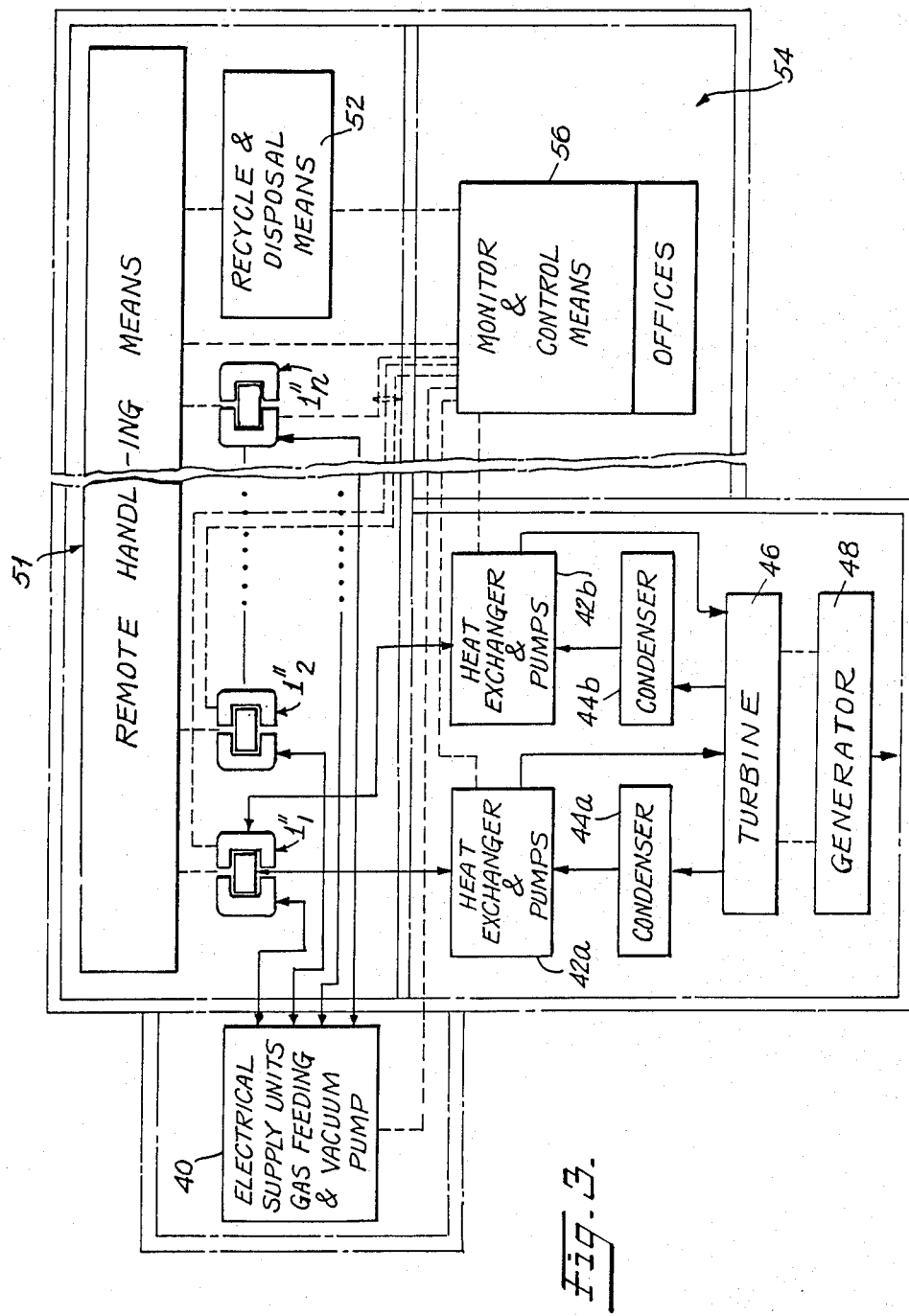
FIG. 3 shows a block diagram of a power generating plant in accordance with the principles of the invention.

FIG. 3 illustrates an electrical power generating system comprising a fusion reaction room containing an array of modules 1" such as those illustrated in FIGS. 2A. Each module in the array is connected to an electrical supply, gas feeding and vacuum unit in accordance with FIG. 1 to supply both the electrical power to each individual fusion power core and the necessary gas feeding and vacuum pumping means. Also interconnected to each of the modules 1" are heat exchange means and conduits which are connected in accordance with elements 8, 10, 12 and 14 of FIG. 1 to extract heat from the blanket units as well as to provide cooling means and heat extraction means for the fusion power cores. A low temperature heat exchange means 42a forms part of the fusion power core coolant/thermal extraction system and is connected to conduit means feeding each fusion power core. For simplicity of illustration, only one such connecting line is shown. A low temperature condenser 44a is connected to the low temperature heat exchange and pump means 42a and to one state of turbine 46. A high temperature heat exchange and pump means 42b forms part of the blanket coolant/thermal extraction system for the modules 1" and is connected to conduit means for feeding each blanket. Again, for simplicity of illustration, only one such conduit means is illustrated. The high temperature heat exchange and pump means 42b is connected to a high temperature condenser 44b and to a second stage of turbine 46. The turbine 46 drives a generator 48 which supplies electrical energy to an electrical gridwork which may in turn be fed by a plurality of units similar to those shown in FIG. 3. Alternatively, instead of or in addition to the electrical conversion one may utilize the turbine 46 to provide mechanical energy such as shaft rotational energy.

A remotely operable means is also provided for removing any given fusion power core from its corresponding blanket so that the fusion power core may be handled, moved, disposed of, or reprocessed to recycle valuable metals, dispose of radioactive contaminants, and/or to manufacture and refabricate an additional (replacement) fusion power core. The remotely operable means may comprise remote handling means 51 and a recycle and disposal means 52. Remote handling means 51 may comprise an overhead crane and means for connecting and disconnecting the various conduits and cables feeding the fusion power core 2. A control room 54 is also shown for providing a monitor and control means 56 and to provide office space for personnel. Monitor and control means 56 monitors and controls the operation of the entire power generating plant and, in particular, monitors and controls each of the various elements in FIG. 1 shown associated with module 1. Additionally, plasma position, temperature and density may be monitored via diagnostic ports (33 of FIG. 1) in each module 1".

An enlarged top view of a single module 1 is illustrated in FIG. 4. The fusion power core 2 is shown in cross section. The blanket is shown to be composed of two regions 4a and 4b which surround the fusion power core 2. The blanket regions 4a and 4b are also shown in cross section but may not necessarily be taken along the same horizontal plane with respect to each other. The blanket region 4a is shown permeated with an artery array of conduits 8 which serve to remove thermal energy generated by neutrons emanating from the fusion power core 2 and absorbed in the surrounding blanket 4. Although not specifically illustrated in FIG. 4, the blanket region 4b may similarly contain an array of conduits for carrying a cooling/thermal energy extraction fluid. The blanket may be comprised of a fluid material instead of the more commonly utilized solid blanket material. If desired, the fluid material may be circulated to serve both as a neutron absorbing medium and as its own coolant/thermal extraction means, i.e., the fluid may be fed via conduits to heat exchange means.

The fusion power core 2 is illustrated in the preferred embodiment as comprising a tokamak-type reactor wherein plasma is contained in cavity region 101 of a toroidal shell 100 which may, for example, be composed of aluminum, stainless steel, niobium, molybdenum or the like. The shell may be in the range of approximately one to a few millimeters thick, and may be coated internally with beryllium, carbides, graphite or aluminum oxide for protection. The shell may likewise be coated with an aluminum oxide or other insulating layer on the outside thereof for insulation of the shell from the surrounding conductors. A series of current carrying conductors or disk coils 102 are disposed around the toroidal shell 100 for establishing the toroidal magnetic field. A plurality of spiral grooves 103 may be provided in the disk coil 102 for passage of a cooling fluid therethrough. The grooves 103 communicate with peripheral channels 103a in the disk coils 102. The coolant fluid passing adjacent the disk coils 102 may be connected to heat exchange means as shown in FIG. 1 to remove thermal energy therefrom for utilizing same for the generation of electric power. Between the disk coil 102 and the shell 100 there may be disposed a cooling channel 104 for passage of the cooling fluid around and along the length of the shell 100. The cooling channel 104 is thus in fluid communication with the spiral grooves 103 and peripheral channels 103a. Supporting the shell 100 in the cooling channel 104 are a plurality of supports 105 which may take the form of small button-like elements or rib members surrounding the toroidal shell.

The cooling channel 104 around the shell 100 (first wall) is utilized to maintain the shell at controlled temperatures. The channel may typically be on the order of one to a few millimeters wide. If necessary for stress and strength consideration, surrounding the disk coils 102 may be a support means 106 which holds the coils 102 in tension against an outer rib 108 and top and bottom support members 110. The support means 106 thus supports the disk coils 102 and shell 100 from the strong forces produced by the generated magnetic fields. Support means 106 may be fabricated, for example, from steel and may be an integral toroidal unit or a plurality of supports, one for each disk coil 102. If the support means is integral over two or more disk coils, then insulation means are provided between the disk coils 102 and support means 106 to prevent shorting out of the disk coils. The support member 110 as well as the outer rib 108 may be made of aluminum or other material and are typically insulated from the support means 106 by insulation means 112 (made, for example, of aluminum oxide). Support members 110 are held together by means of a central load carrying member 114 (made of ceramic, for example) as well as by sealed joints 116 at the periphery of the support means 106.

The fusion power core 2 is provided with ohmic heating coils 120 which may take the form of an air core or saturated iron core transformer. All of the coils illustrated in FIG. 4 are utilized for ohmic heating. Additional auxiliary heating and vertical field coils may also be provided as more clearly illustrated in reference to FIG. 5 discussed below.

Various coolant conduits are provided in the module 1 of FIG. 4 such as fluid conduits 124, 125, 126 and 127. Fluid conduits 124 and 125 are inflow and outflow conduits respectively which are associated with shell 100 and disk coil 102. The fluid is passed into the fusion power core 2 and circulates in grooves 103 and channels 103a of the disk coils 102 and within the cooling channel 104 adjacent and exterior to the shell 100. Fluid conduits 126 and 127 are inflow and outflow conduits respectively and associated with the ohmic heating coils (as well as vertical and auxiliary heating coils if desired). Thus, conduits 124, 125, 126 and 127 form part of the fusion power core coolant/thermal extraction system as disclosed in reference to FIGS. 1 and 3.

In order to facilitate removal of the fusion power core 2 from the blanket 4 for replacement of the fusion power core, the conduits 124–127 are passed through coupling means 128 before interconnecting to the fusion power core 2. Coupling means 128 permits each separation of the fluid conduit sections contained within the fusion power core from the external conduits leading to the heat exchange and pump means. Consequently, when the fusion power core is separated from the blanket 4, it is only necessary to disconnect the sections of the fluid conduit at the coupling means 128. Functionally similar coupling means 128' are provided for electrical connections 129 to ohmic heating (OH) coils 120 of the fusion power core 2.

The fusible gas, for example, an equal mixture of deuterium and tritium is fed into the cavity region 101 of shell 100 via a fuel inlet conduit 134. Valve means (32 of FIG. 1) are connected to the fuel conduit 134 to regulate the flow of fusible fuel into the plasma cavity region 101. An extraction fuel conduit 136 is connected to pump means (30 of FIG. 1) and is provided to extract the plasma during the gas purge cycle of operation. Both conduits 134 and 136 may be provided with small nozzle means to couple to the cavity region 101. Coupling means 128 may also be provided for the conduits 134 and 136 as shown.

FIG. 4 also illustrates in region 4b of the blanket 4 special fluid passages 130 for cooling regions 132 containing lithium used for breeding tritium. The tritium may later be used in the fusion power core for the D,T fusion reaction. Region 132 may contain, for example, canned lithium alloys.

A neutron monitor 133 is shown positioned between the fusion power core 2 and blanket 4 to provide a means for measuring the reaction rates within the plasma. The fusion reaction rate may, of course, be indicative of the plasma temperature or density. The plasma temperatures may be determined in a conventional manner as, for example, by utilizing laser interferometer techniques via the diagnostic port 33 (FIG. 1).

The overall size of the fusion power core 2 in FIG. 4 is quite small in comparison with conventional tokamak designs. In particular, the fusion power core 2 may have a major radius of approximately 50 centimeters and a minor radius of approximately 20 centimeters. The radial thickness of the disk coils 102 is approximately 10 centimeters and each coil may extend a few centimeters in thickness. One particular coil is illustrated in FIGS. 5, 5A and 5B and employs cooling grooves 103' in the form of radial grooves which may alternately be used instead of the spiral grooves shown in FIGS. 4 and 6. One portion of the disk coil is bent outwardly for alignment with the adjacent disk coil around the toroidal shell 100. The disk coils 102 are arranged around the plasma shell 100 and are placed adjacent to each other to form a complete coil producing the toroidal field. It is contemplated that 176 such disk coils may be utilized either series connected or connected in modular groups such that there are 8 separate coils per each coil group with a total of 22 coil groups. In such an arrangement each coil group would comprise one complete turn and would be electrically connected to the next coil group to form a series current path through the entire plurality of coils.

FIG. 6 illustrates an enlarged sectional view of part of the fusion power core as shown in FIG. 4. Fluid conduits 124 and 126 and fuel conduit 134 have already been discussed in relation to FIG. 4. Various field coils are shown in FIG. 6 in addition to the OH coils 120. For example, field coils 142 may be used to provide a vertical field (VF) for positioning the plasma, and coils 144 may be used, if desired, as auxiliary heating coils. Auxiliary heating of the plasma may, of course, be provided by other means such as ripple currents on the VF coils 142, microwave techniques etc.

Figure 7:
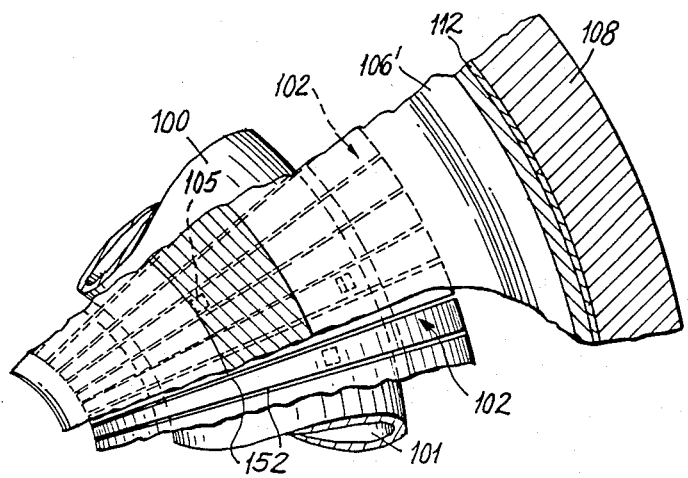
FIG. 7 illustrates a segment of the toroidal shell and disk coils as taken along lines 7—7 of FIG. 6.
Figure 7A:
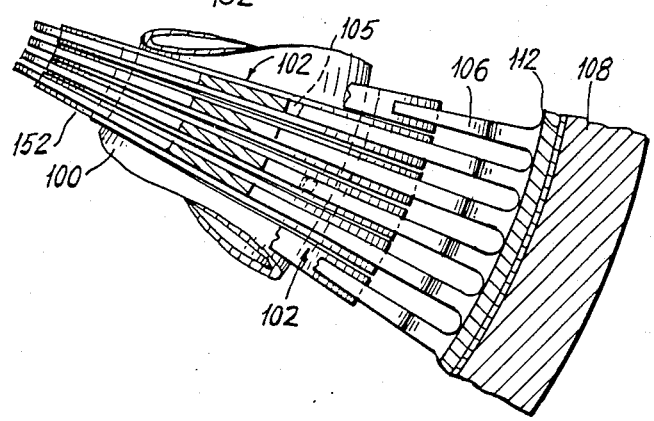
FIG. 7A illustrates another embodiment of the toroidal shell and disk coils in accordance with the invention.

FIG. 7 illustrates a cross-sectional view of the fusion power core showing the disk coils 102 and support means 106 as taken along line 7—7 of FIG. 6. Ohmic heating coils and conduits are now shown for simplicity of illustration. FIG. 7 shows the disk coils 102 with an integral support means 106'. Support means 106' is shown broken away so that the disk coils 102 may be more clearly seen. Each disk 102 is wedged-shaped and separated by an insulation means 152 which may take the form of a thin ceramic disk. The insulation means 152 may alternately be provided by an insulating coating on the disk coils 102. FIG. 7A illustrates the disk coils 102 with separate support means 106, one such support means associated with each disk coil 102.

Figure 8:
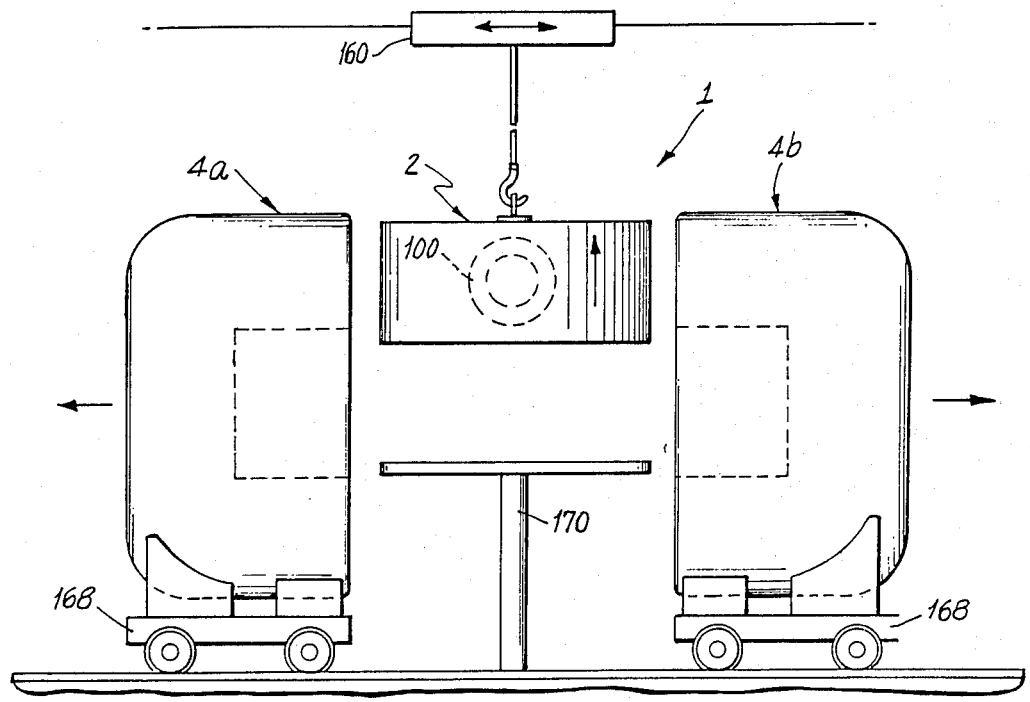
FIG. 8 is a side plan view of the module of the invention illustrating the removal of the fusion power core from the surrounding blanket.

FIG. 8 is a side plan view of a module 1 wherein the fusion power core 2 is being removed from the blanket regions 4a and 4b by an overhead crane 160 forming part of the remote handling means 51. The blanket regions 4a and 4b are carried on support means such as a remotely operable trolley 168 for separating the blanket regions to allow removal of the fusion power core 2.

For ease of illustration, various fluid conduits, gas and vacuum feed lines and electrical connection lines are not shown. The crane 160 lifts the fusion power core 2 from a support means 170 and moves it to the recycle and disposal means 52 (FIG. 3) for processing. A new or recycled fusion power core 2 is then placed on the support means 170 via the overhead crane 160 and the fluid conduit, gas feed and vacuum lines as well as electrical connections are connected via the remote handling means 51 to the new fusion power core 2.

The fusion power core may be driven to ignition and thence to power producing levels in cycles utilizing gas staging techniques as described in copending application Ser. No. 755,794 filed Dec. 30, 1976 and/or utilizing e-beam techniques as described, for example in U.S. Pat. No. 3,831,101 incorporated herein by reference.

In practice, each fusion power core 2 of FIG. 3 is cycled through an initial start-up stage, ignition stage and burn stage so that the residual gas in the plasma cavity 101 may be pumped out and a new gas mixture introduced at the beginning of stage 1. Power is switched into each fusion power core 2 in a sequential manner by means of the electrical supply units 40 and monitor and control means 56 of FIG. 3. For example, assume that there are 20 fusible power core units operating at a "burn time" of 25 seconds with a 30-second total cycle time. The control means for the power system activates unit 1 associated with the first fusion power core. Approximately 1.5 seconds later (30/20) power is supplied to unit 2 while continuing power to unit 1. Three seconds later, unit 3 is switched on while continuing power to units 1 and 2, etc., until all units are being driven at the 30-second cycle time. In this manner, an average power output may be supplied by the generator 48. It is expected, of course, that not all of the fusion power cores will need replacement at the same time. The replacement of any given fusion power core is thus made as required, but because of the small size and simplicity of the replacement procedure such replacement takes a relatively short time and does not require shutdown of other fusion power cores. Consequently, such replacement will not appreciably effect the overall power output of the generating plant.

While the invention has been described in reference to the preferred embodiments set forth above, it is evident that modifications and improvements may be made by one of ordinary skill in the art, and it is to be understood that, within the scope of the appended claims, the invention may be practiced otherwise than as specifically set forth herein.

I claim:

1. A modular installation for generating thermal energy from fusion reactions in an ionized plasma of fusible fuel comprising:
   (a) a plurality of fusion core units each including as components thereof,
      1. a vacuum plasma cavity for containing said fusible fuel said cavity in the form of a toroid surrounding a central region;
      2. a plurality of toroidal field coils surrounding said plasma cavity for generating a toroidal magnetic field therein; and
      3. ohmic heating means for inducing an ohmic heating current in the ionized plasma within the plasma cavity of each of said fusion core units for raising the temperature of said plasma, said ohmic heating means including a transformer means contained within said central region so that said toroidal plasma cavity surrounds said transformer means, and said ohmic heating current generating a poloidal magnetic field within said plasma, said components of each fusion core unit being so arranged and interconnected as to allow handling of said fusion core unit as a single entity;
   (b) disconnectable means extending into each of said fusion core units for delivering said fusible fuel therein;
   (c) a plurality of disconnectable means for transporting a cooling fluid to and through the toroidal field coils of each of said fusion core units;
   (d) a power supply connected through disconnectable means to said toroidal field coils for generating a toroidal magnetic field for confining the ionized plasma within the plasma cavity of said fusion core units, said toroidal magnetic field having a strength of on the order of greater than 100 KG;
   (e) said plurality of toroidal field coils comprising high-strength, non-superconducting conductors for sustaining said toroidal magnetic field and for withstanding said thermal energy;
   (f) a plurality of blanket means, one corresponding to each of said fusion core units, each of said blanket means being positioned completely outside of and substantially surrounding said toroidal field coils, each of said blanket means comprising at least two modules;
   (g) said toroidal field coils and said plasma cavity have no blanket means therebetween;
   (h) means for connecting and disconnecting each of said disconnectable means, means for separating said at least two modules of each blanket means a distance sufficient to allow removal of the respective fusion core unit, means for removing and inserting a fusion core unit as a single entity between the separated modules of each blanket means;
   (i) a plurality of blanket cooling fluid transport means connected to said plurality of blanket means for transporting a cooling fluid to and through each of said blanket means; and
   (j) means, connected to at least one of the plurality of blanket cooling fluid transport means and the plurality of toroidal field cooling fluid transport means, for extracting thermal energy therefrom whereby the means for extracting thermal energy is operable to receive thermal energy from all of said plurality of fusion core units of said modular installation which are operating at a given time.

2. A modular installation as recited in claim 1 wherein said each fusion core unit includes a toroidal housing having a major radius on the order of 50 cm and a minor radius on the order of 20 cm.

3. A modular installation as recited in claim 1 wherein said plasma cavity further includes a shell surrounded by said toroidal field coils and said means for transporting a cooling fluid to and through said plurality of toroidal field coils further comprises means for transporting said cooling fluid around surfaces of said toroidal shell adjacent said toroidal field coils.

4. A modular installation as recited in claim 1 wherein said blanket means further include tritium breeding means for generating tritium from neutrons emitted by said fusion reactions.

5. A modular installation as recited in claim 1 wherein said plasma cavity further includes a shell surrounded by said toroidal field coils.

6. A modular installation as recited in claim 5 wherein said means for magnetically confining said plasma further comprises means, in addition to said ohmic heating means, for generating said poloidal magnetic field.

7. A modular installation as recited in claim 1 wherein each of said fusion core units comprise a toroidal region having an aspect ratio of about on the order of 2.5.

8. A modular installation as recited in claim 1 wherein said plurality of toroidal field coils comprise copper coils.

9. A modular installation for generating thermal energy from fusion reactions in an ionized plasma of fusible fuel comprising:
(a) a plurality of fusion core units each including as components thereof,
  1. a toroidal vacuum plasma cavity for containing said fusible fuel said cavity in the form of a toroid surrounding a central region;
  2. a plurality of toroidal field coils surrounding said plasma cavity for generating a toroidal magnetic field therein; and
  3. ohmic heating means for inducing an ohmic heating current in the ionized plasma within the plasma cavity of each of said fusion core units for raising the temperature of said plasma, said ohmic heating means including a transformer means contained within said central region so that said toroidal plasma cavity surrounds said transformer means, and said ohmic heating current generating a poloidal magnetic field within said plasma, said components of each fusion core unit being so arranged and interconnected as to allow handling of said fusion core unit as a single entity;
(b) disconnectable means extending into each of said fusion core units for delivering said fusible fuel therein:
(c) a plurality of disconnectable means for transporting a cooling fluid to and through the toroidal field coils of each of said fusion core units;
(d) a power supply connected through disconnectable means to said toroidal field coils for generating a toroidal magnetic field for confining the ionized plasma within the plasma cavity of said fusion core units, said toroidal magnetic field having a strength of on the order of greater than 100 KG;
(e) said plurality of toroidal field coils comprising high-strength, non-superconducting conductors for sustaining said toroidal magnetic field and for withstanding said thermal energy;
(f) a single blanket means positioned completely outside of and substantially surrounding the toroidal field coils of said plurality of fusion core units, said blanket means having a common inlet and a common outlet for said toroidal field coil cooling fluid transport means said blanket, means comprising at least two modules;
(g) said toroidal field coils and said plasma cavity have no blanket means therebetween;
(h) means for connecting said disconnecting each of said disconnectable means, means for separating said at least two modules of said blanket means a distance sufficient to allow removal of a predetermined fusion core unit, means for removing and inserting a fusion core unit as a single entity between the separated modules of said blanket means;
(i) blanket cooling fluid transport means connected to said blanket means for transporting a cooling fluid to and through said blanket means; and
(j) means, connected to the blanket cooling fluid transport means and the plurality of toroidal field cooling fluid transport means, for extracting thermal energy therefrom whereby the means for extracting thermal energy is operable to receive thermal energy from all of said plurality of fusion core units of said modular installation which are operating at a given time.

10. A modular installation as recited in claim 9 wherein said toroidal field coils and said plasma cavity have no blanket means therebetween.

11. A modular installation as recited in claim 1 wherein said toroidal magnetic field strength is on the order of 100-150 kg.

12. A modular installation as recited in claim 1 wherein said means for extracting thermal energy is connected to both said blanket cooling fluid transport means and said toroidal field coil cooling fluid transport means.

13. A modular installation as recited in claim 12 wherein said thermal energy extraction means comprises a first fluid transport means for extracting thermal energy from each of said plurality of toroidal field coils and a second fluid transport means for extracting thermal energy from each of said plurality of blanket means.

14. A modular installation as recited in claim 13 wherein said first fluid transport means connects each of said plurality of toroidal field coils in series with one another and with a heat exchange means.

15. A modular installation as recited in claim 13 wherein said first fluid transport means separately connects each of said plurality of toroidal field coil cooling fluid transport means to a heat exchange means.

16. A modular installation as recited in claim 13 wherein said second fluid transport means connects each of said plurality of blanket cooling fluid transport means in series with one another and with a heat exchange means.

17. A modular installation as recited in claim 13 wherein said second fluid transport means separately connects each of said plurality of blanket cooling fluid transport means to a heat exchange means.

18. A modular installation as recited in claim 12 wherein said thermal energy extraction means comprises a single cooling fluid transport means for the toroidal field coils of each of said plurality of fusion core units and for said corresponding plurality of blanket means.

19. A modular installation as recited in claim 18 wherein said single fluid transport means connects the cooling fluid transport means for the toroidal field coils of each of said plurality of fusion core units and the cooling fluid transport means for the corresponding blanket means in series with one another and with a heat exchange means.

20. A modular installation as recited in claim 18 wherein said single fluid transport means separately connects the cooling fluid transport means for the plurality of toroidal field coils of each of said plurality of fusion core units and the cooling fluid transport means for the corresponding blanket means to a heat exchange means.

* * * * *